United States Patent
De Pena et al.

(10) Patent No.: US 10,625,469 B2
(45) Date of Patent: Apr. 21, 2020

(54) GENERATING THREE-DIMENSIONAL OBJECTS

(71) Applicant: HEWLETT-PACKARD DEVELOPMENT COMPANY, L.P., Houston, TX (US)

(72) Inventors: Alejandro Manuel De Pena, Sant Cugat del Valles (ES); Fernando Juan Jover, Sant Cugat del Valles (ES); Sebastia Cortes i Herms, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 330 days.

(21) Appl. No.: 15/111,685

(22) PCT Filed: Apr. 29, 2014

(86) PCT No.: PCT/US2014/035823
§ 371 (c)(1),
(2) Date: Jul. 14, 2016

(87) PCT Pub. No.: WO2015/108555
PCT Pub. Date: Jul. 23, 2015

(65) Prior Publication Data
US 2016/0332384 A1    Nov. 17, 2016

(30) Foreign Application Priority Data

Jan. 16, 2014   (WO) ................ PCT/EP2014/050841
Jan. 31, 2014   (WO) ................ PCT/US2014/014076

(51) Int. Cl.
*B29C 64/393*   (2017.01)
*B33Y 10/00*    (2015.01)
(Continued)

(52) U.S. Cl.
CPC ............ *B29C 64/393* (2017.08); *B29C 64/00* (2017.08); *B29C 64/386* (2017.08); *B29C 64/40* (2017.08);
(Continued)

(58) Field of Classification Search
CPC ....... B29C 64/00; B29C 64/20; B29C 64/245; B29C 64/25; B29C 64/295; B29C 64/188;
(Continued)

(56) References Cited

U.S. PATENT DOCUMENTS 5,427,733 A * 6/1995 Benda ................. B22F 3/1055
                                                  264/40.1
5,508,489 A * 4/1996 Benda ................. B22F 3/1055
                                                  219/121.76
(Continued)

FOREIGN PATENT DOCUMENTS

JP    2009-220576 A    10/2009
WO    WO-2013127655 A1  9/2013

OTHER PUBLICATIONS

Gong, X. et al., Review on Powder-based Electron Beam Additive Manufacturing Technology, Proceedings of the ASME 2012 International Syposium on Flexible Automation, Jun. 18-20, 2012, St. Louis, MO, ISFA2012-7256, pp. 1-9. http://www.me.ua.edu/PMRF/ISFA2012-7256.pdf.

*Primary Examiner* — Robert C Dye
*Assistant Examiner* — Taryn Trace Willett
(74) *Attorney, Agent, or Firm* — HP Inc. Patent Department

(57) ABSTRACT

A controller may be to receive temperature data representing a temperature distribution of at least part of a current layer of build material that is measured by a temperature sensor. The controller may be to determine one or more weighting factors representing a degree of influence of each of one or
(Continued)

Figure 1:
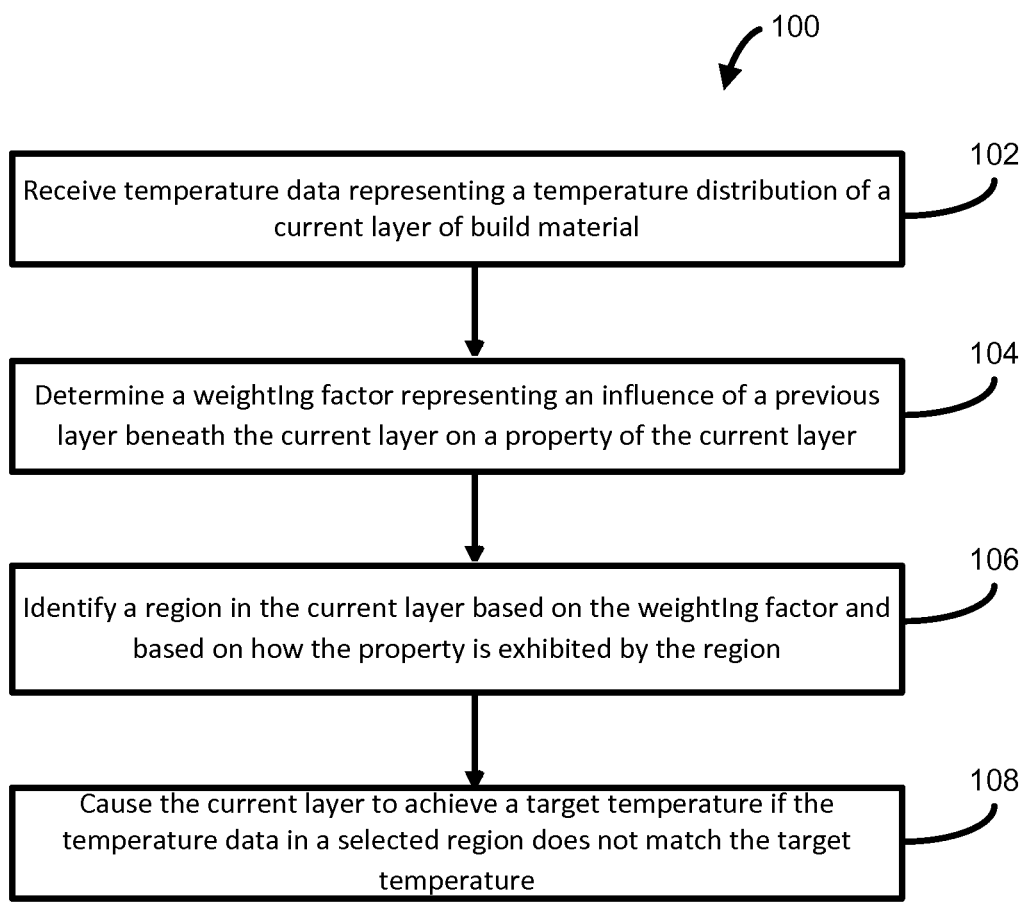

more previous layers of the build material beneath the current layer on a property of the current layer. The controller may be to identify one or more regions in the current layer based on the one or more weighting factors and based on how the property is exhibited by each of the one or more regions. The controller may be to cause the current layer to achieve a target temperature if the temperature data in a selected region of the identified one or more regions does not match the target temperature.

20 Claims, 5 Drawing Sheets

(51) Int. Cl.
  *B33Y 50/02* (2015.01)
  *B29C 64/00* (2017.01)
  *B29C 64/386* (2017.01)
  *B29C 64/40* (2017.01)
  *B33Y 30/00* (2015.01)
  *B29C 64/188* (2017.01)

(52) U.S. Cl.
  CPC .............. *B33Y 10/00* (2014.12); *B33Y 30/00* (2014.12); *B33Y 50/02* (2014.12); *B29C 64/188* (2017.08)

(58) Field of Classification Search
  CPC ... B29C 64/264; B29C 64/268; B29C 64/277; B29C 64/291; B29C 64/386; B29C 64/393; B29C 67/0085; B29C 67/0096; B29C 67/0055; B29C 67/0051; B29C 67/0059; B29C 67/0062; B29C 67/0066; B29C 67/007; B29C 67/0074; B29C 67/0077; B29C 67/0081; B29C 67/0088; B29C 67/0092; B33Y 10/00; B33Y 30/00; B33Y 40/00; B33Y 99/00
  See application file for complete search history.

(56) References Cited

U.S. PATENT DOCUMENTS

| | | | | |
|---|---|---|---|---|
| 5,866,058 A * | 2/1999 | Batchelder | ............ | B29C 64/106 264/237 |
| 6,162,378 A * | 12/2000 | Bedal | ............ | B29C 41/52 264/40.1 |
| 6,366,825 B1 * | 4/2002 | Smalley | ............ | G06T 17/00 264/401 |
| 7,433,627 B2 * | 10/2008 | German | ............ | B41J 11/002 347/102 |
| 7,515,986 B2 * | 4/2009 | Huskamp | ............ | G05D 23/1919 219/405 |
| 7,537,722 B2 * | 5/2009 | Andersson | ............ | B22F 3/004 264/40.6 |
| 9,066,028 B1 * | 6/2015 | Koshti | ............ | H04N 5/33 |
| 2003/0044593 A1 * | 3/2003 | Vaidyanathan | ............ | B29B 15/122 428/297.4 |
| 2003/0222066 A1 * | 12/2003 | Low | ............ | B22F 3/1055 219/121.83 |
| 2004/0187714 A1 * | 9/2004 | Napadensky | ............ | B29C 64/40 101/35 |
| 2004/0200816 A1 * | 10/2004 | Chung | ............ | G05D 23/1919 219/121.83 |
| 2007/0196561 A1 * | 8/2007 | Philippi | ............ | B33Y 30/00 427/8 |
| 2008/0131546 A1 * | 6/2008 | Perret | ............ | B22F 3/1055 425/143 |
| 2010/0125356 A1 * | 5/2010 | Shkolnik | ............ | G06T 1/00 700/98 |
| 2012/0100031 A1 * | 4/2012 | Ljungblad | ............ | B29C 64/153 419/7 |
| 2012/0139167 A1 | 6/2012 | Fruth et al. | | |
| 2012/0280415 A1 * | 11/2012 | Halford | ............ | B29C 35/0288 264/40.1 |
| 2013/0098068 A1 * | 4/2013 | Takahashi | ............ | F25B 21/02 62/3.2 |
| 2015/0045928 A1 * | 2/2015 | Perez | ............ | G05B 19/41875 700/110 |
| 2015/0056319 A1 * | 2/2015 | Din | ............ | B29C 67/0055 425/162 |
| 2015/0061195 A1 * | 3/2015 | DeFelice | ............ | B29C 64/386 264/497 |
| 2015/0174658 A1 * | 6/2015 | Ljungblad | ............ | B33Y 10/00 419/55 |
| 2015/0328838 A1 * | 11/2015 | Erb | ............ | B29C 67/0088 700/119 |
| 2016/0096326 A1 * | 4/2016 | Naware | ............ | B29C 67/0085 425/143 |
| 2016/0096327 A1 * | 4/2016 | Fry | ............ | B29C 67/0085 264/443 |
| 2016/0107229 A1 * | 4/2016 | Okazaki | ............ | B22F 3/1055 425/78 |
| 2017/0304895 A1 * | 10/2017 | Porch | ............ | B33Y 10/00 |

* cited by examiner

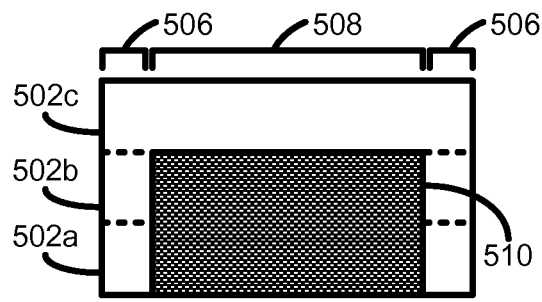
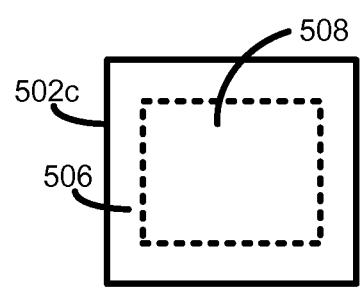
FIG. 5a　　　　FIG. 6a
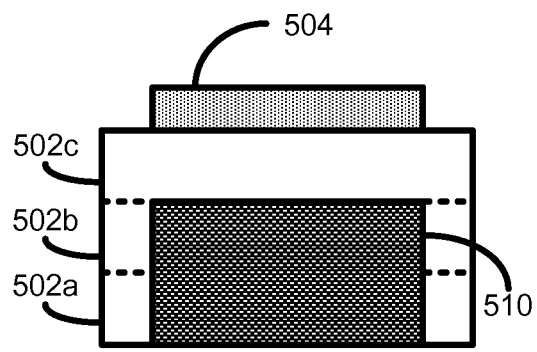
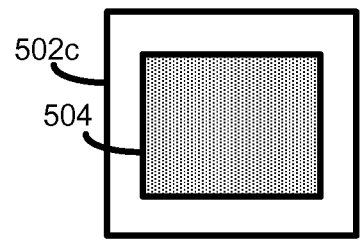
FIG. 5b　　　　FIG. 6b
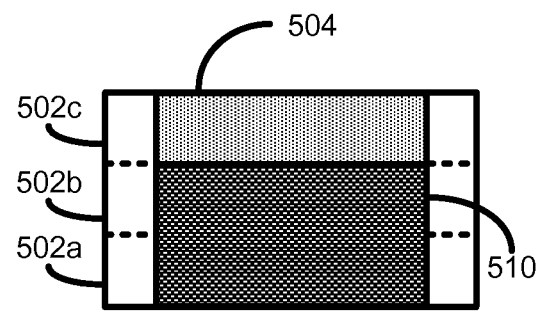
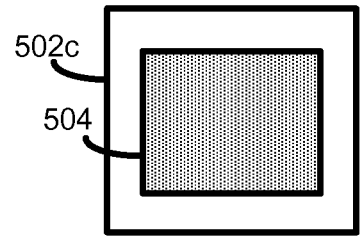
FIG. 5c　　　　FIG. 6c
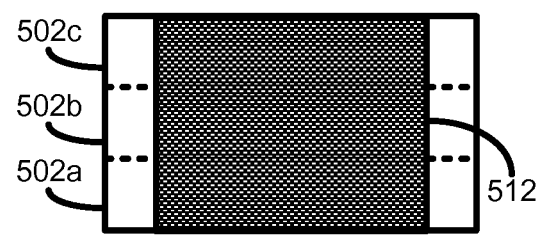
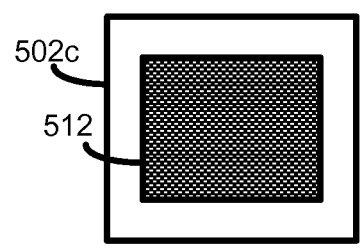
FIG. 5d　　　　FIG. 6d

GENERATING THREE-DIMENSIONAL OBJECTS

RELATED APPLICATIONS

This application claims the benefit of PCT Application No. PCT/US2014/014076 filed on Jan. 31, 2014, entitled "GENERATING THREE-DIMENSIONAL OBJECTS", the entire contents of which are hereby incorporated herein by reference, and which itself claims the benefit of PCT Application No. PCT/EP2014/050841 filed on Jan. 16, 2014, entitled "GENERATING A THREE-DIMENSIONAL OBJECT", the entire contents of which are hereby incorporated herein by reference.

BACKGROUND

Additive manufacturing systems that generate three-dimensional objects on a layer-by-layer basis have been proposed as a potentially convenient way to produce three-dimensional objects in small quantities.

The quality of objects produced by such systems may vary widely depending on the type of additive manufacturing technology used. Generally, low quality and low strength objects may be producible using lower cost systems, whereas high quality and high-strength objects may be producible using higher cost systems.

BRIEF DESCRIPTION

Figure 2A:
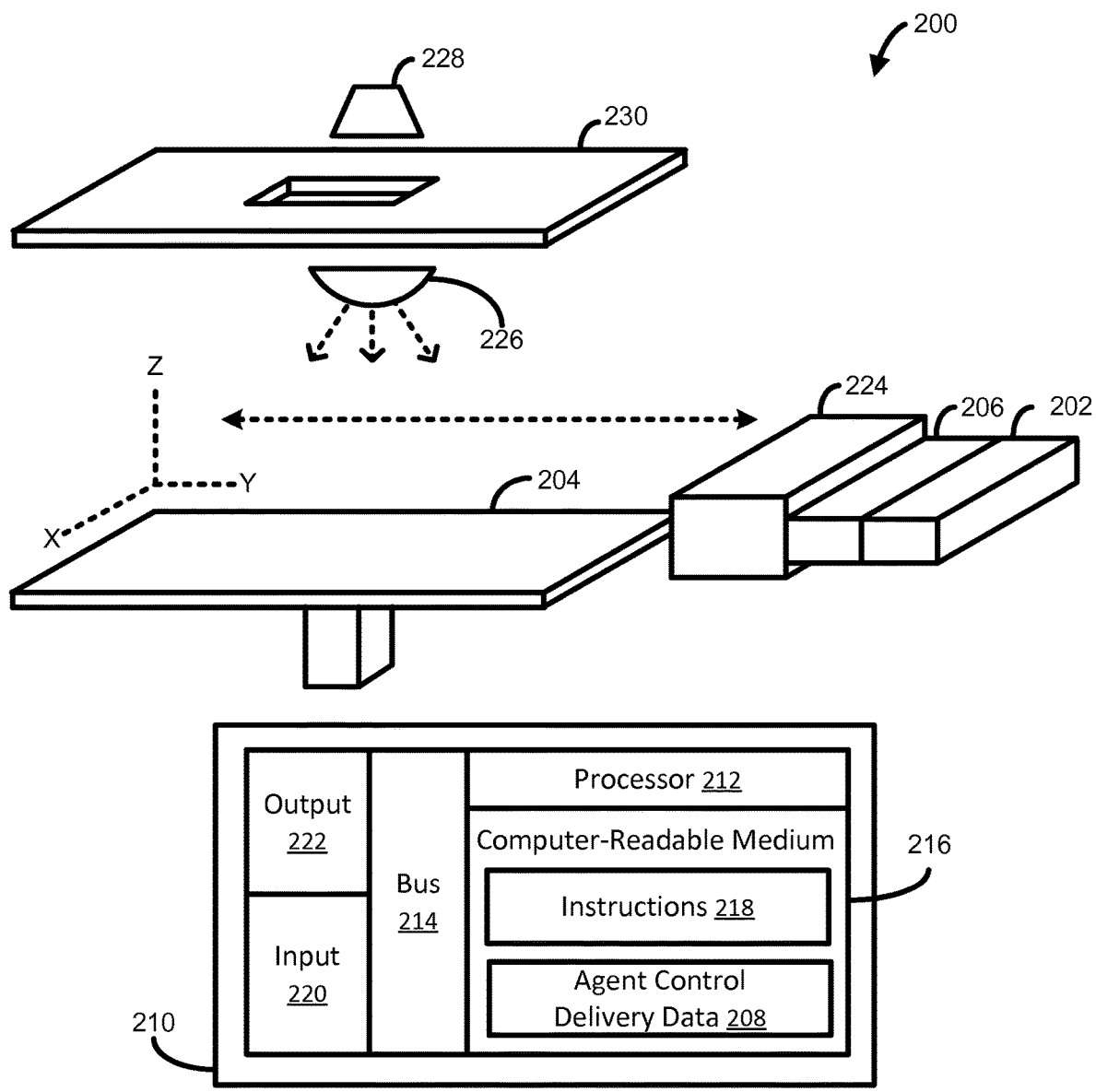
Figure 2B:
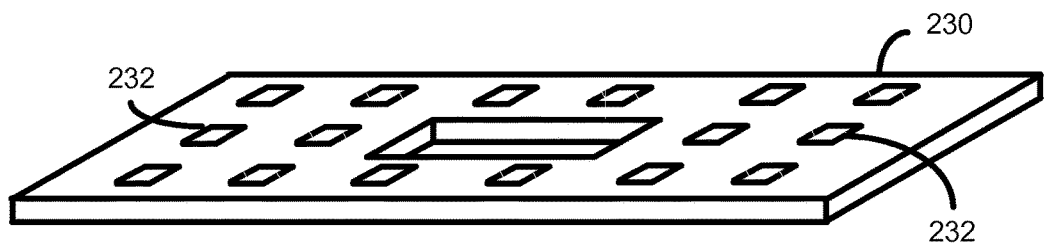
Figure 3:
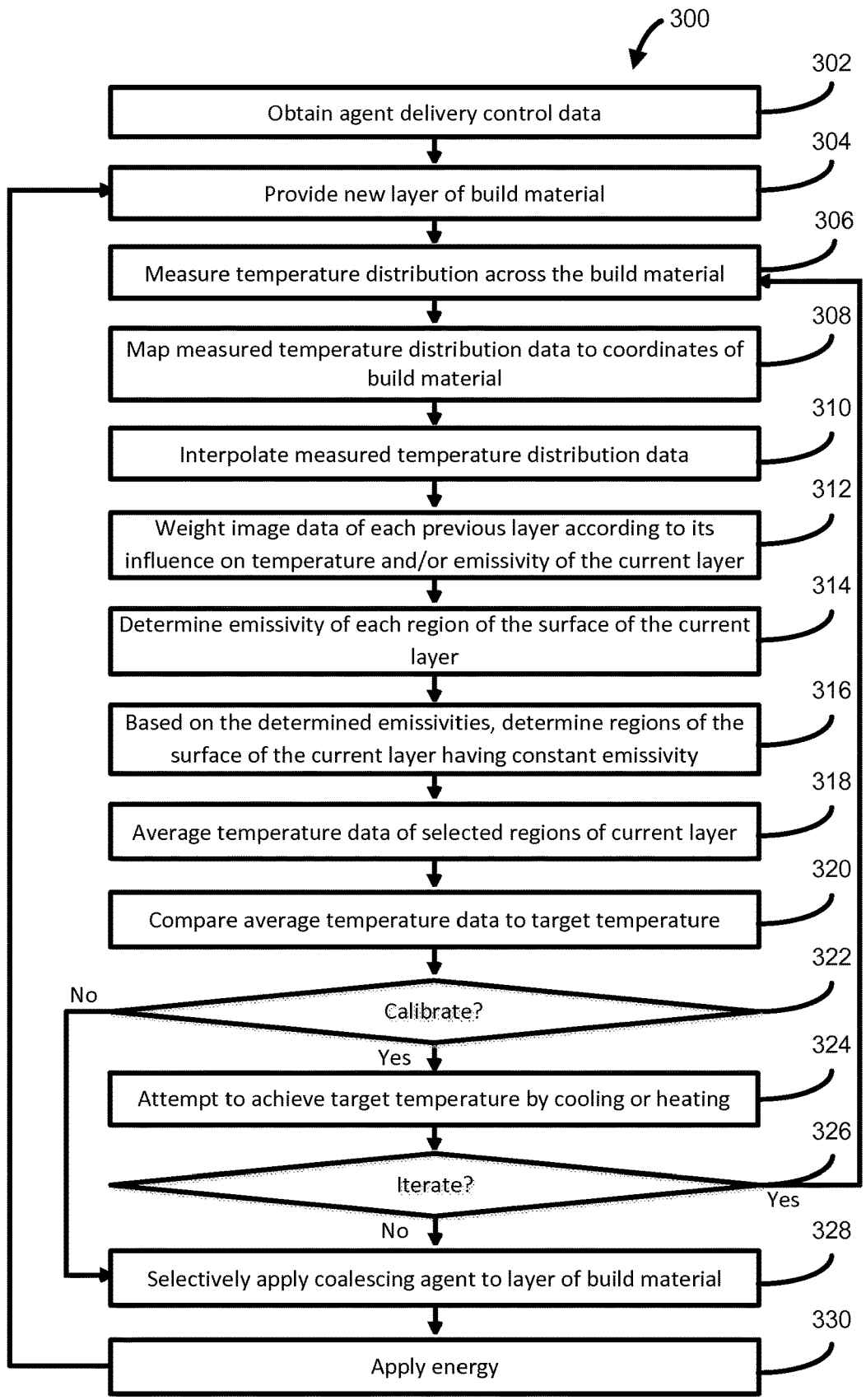
Figure 4:
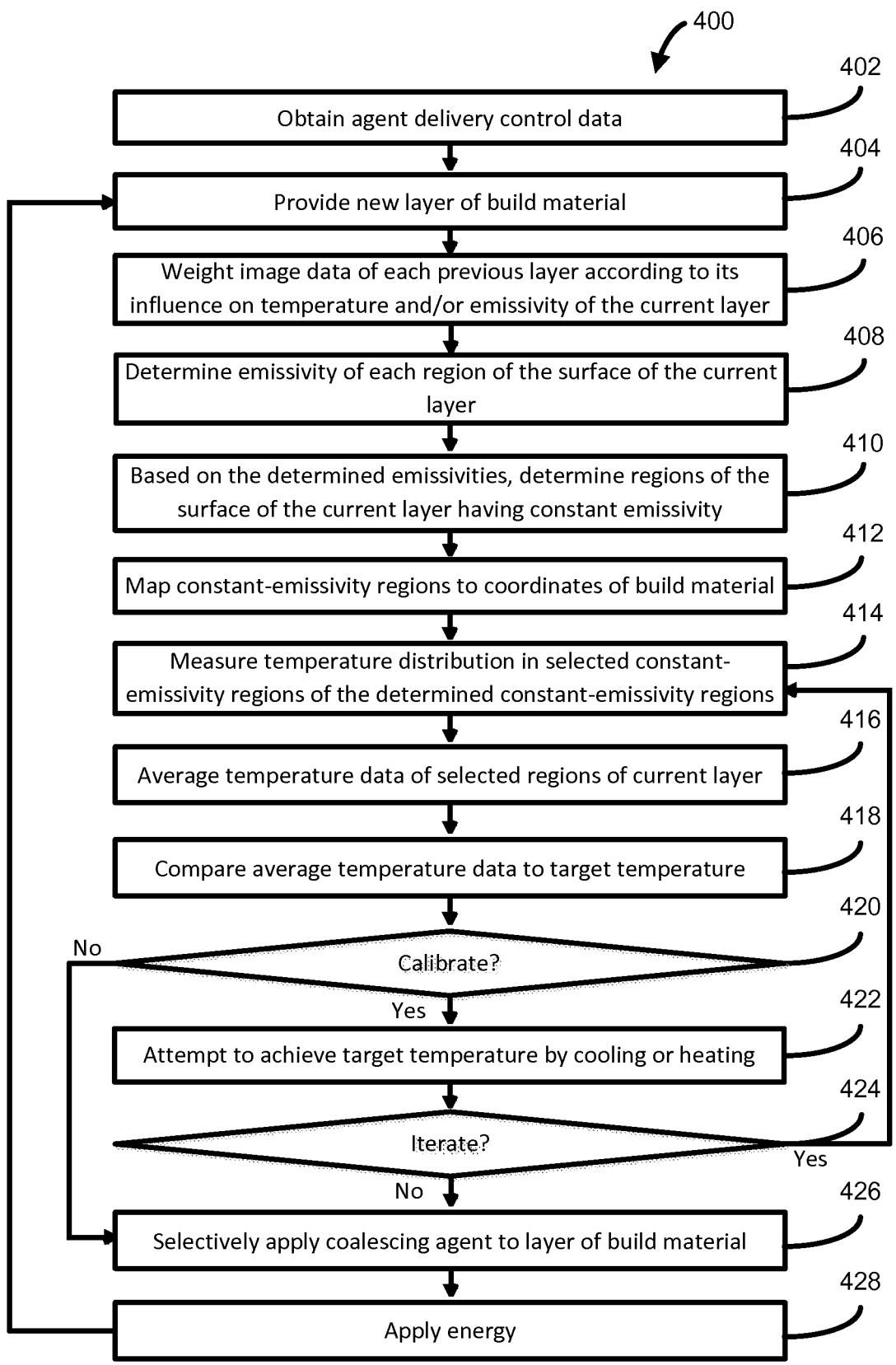

Some examples are described with respect to the following figures:

FIGS. 1, 3, and 4 are flow diagrams illustrating methods of generating a three-dimensional object according to some examples;

FIG. 2*a* is a simplified isometric illustration of an additive manufacturing system according to some examples;

FIG. 2*b* is a simplified isometric illustration of a heater for an additive manufacturing system according to some examples;

FIGS. 5*a-d* show a series of cross-sectional side views of layers of build material according to some examples; and FIGS. 6*a-d* show a series of top views of the layers of build material of FIGS. 5*a-d* according to some examples.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

Using an additive manufacturing system, a three-dimensional object may be generated through the solidification of portions of one or more successive layers of build material. The build material can, for example be powder-based, and the properties of generated objects may be dependent on the type of build material and the type of solidification mechanism used. In some examples, solidification may be achieved using a liquid binder agent to chemically solidify build material. In other examples, solidification may be achieved by temporary application of energy to the build material. This may, for example, involve use of a coalescing agent, which is a material that, when a suitable amount of energy is applied to a combination of build material and coalescing agent, may cause the build material to coalesce and solidify. In other examples, other methods of solidification may be used.

Object properties may depend on the nature of the build materials used, the processes by which build material is solidified to form a desired three-dimensional object, and temperatures of build materials during such processes. Such properties may include, for example, surface roughness, accuracy, and strength.

In some examples, energy absorbed by build material on which coalescing agent has been delivered or has penetrated may also propagate into surrounding build material. The energy may be sufficient to cause surrounding build material to heat up. For example, the energy may propagate laterally through the build material, beneath the current layer (uppermost layer), and/or into a future layer once it is applied on the newest layer. A heat reservoir may form beneath the surface of each newly created layer as the new layer is formed. The heat in the reservoir may then slowly propagate laterally across the build material, below the newest layer, and/or into a future layer once it is applied on the newest layer.

Thus, portions of the build material may be heated to a temperature suitable to cause softening and bonding of build material. This temperature could be above or below the material melting point. This may result in the subsequent solidification of portions of the build material that were not intended to be solidified and this effect is referred to herein as coalescence bleed. Coalescence bleed may result, for example, in a reduction in the overall accuracy of generated three-dimensional objects. For example, deformations may include three-dimensional portions such as a deformation extending laterally from the sides of the object, and a deformation extending below from the bottom of the object. Deformations may also include smaller irregularities in solidification due to undesired temperature distributions or heat conduction effects across the build material.

Moreover, spatial or temporal temperature gradients in the build material may decrease object accuracy through inhomogeneous contraction of the object because, for example, some build materials may be optimally processed in very narrow temperature windows.

Accordingly, the present disclosure allows temperature feedback of the build material to allow temperature to be regulated throughout the build process. Thus, desired object properties and control of the generation of the three-dimensional object may be achieved, including reduction of deformations, control of mechanical properties, and consistency when generating objects built at different times. In some examples, after obtaining temperature feedback from a current layer of build material, a temperature in a selected region of the current layer may be compared with a target temperature. The selected region may be determined based on how one or more previous layers may affect a property of the selected region.

Such a property may be the emissivity of the region. The emissivity of a material is the relative ability of its surface to emit energy. The emissivity may be any percentage up to 100%. An emissivity of 50% corresponds to a material having a given temperature and emitting half the amount of energy emitted by an ideal black body at that same temperature. Generally, emissivity may, for example, depend on the type of material, the material's chemical composition, surface characteristics such as degree of roughness, material geometry such as thickness of the material layer, and other factors. The duller and blacker the material appears, the closer its emissivity may be to 100%. Thus, emissivity of build material may also depend on whether the build material has (1) coalesced and solidified, or is coalescing, or (2) has not coalesced and solidified. For example, build material that has coalesced may exhibit lesser emissivity than build material that has not coalesced. Un-solidified build material may be transmittive to radiation, such as IR radiation used in measuring temperature. Thus, the emissivity exhibited by a region of a layer of build material may be affected by the state of regions immediately below in previous layers, for example whether these regions have coalesced and solidified.

In some examples, the selected region may have a substantially constant emissivity. This may allow the system to easily correct the temperature measurements and/or achieve highly accurate temperature data from the selected region, thus allowing precise temperature regulation throughout the build process, such that build material may be maintained in an optimal temperature window. Moreover, a greater variety of materials may be used because materials having narrow temperature windows for optimal processing may still be useable.

FIG. 1 is a flow diagram illustrating a method according to some examples. In one example a controller may perform each of the following blocks. At block 102, a controller may receive temperature data representing a temperature distribution of at least part of a current layer of build material that is measured by a temperature sensor. At block 104, the controller may determine one or more weighting factors representing a degree of influence or effect each of one or more previous layers of the build material beneath the current layer may have on a property of the current layer. At block 106, the controller may identify one or more regions in the current layer based on the one or more weighting factors and based on how the property is exhibited by each of the one or more regions. At block 108, the controller may cause the current layer to achieve a target temperature if the temperature data in a selected region of the identified one or more regions does not match the target temperature. Any suitable heating or cooling mechanism may be used to achieve the target temperature.

FIG. 2a is a simplified isometric illustration of an additive manufacturing system 200 according to some examples. The system 200 may be operated, as described further below with reference to the flow diagram of FIG. 3, to generate a three-dimensional object.

In some examples the build material may be a powder-based build material. As used herein the term powder-based materials is intended to encompass both dry and wet powder-based materials, particulate materials, and granular materials. In some examples, the build material may include a mixture of air and solid polymer particles, for example at a ratio of about 40% air and about 60% solid polymer particles. One suitable material may be Nylon 12 (e.g. a polyamide), which is available, for example, from Sigma-Aldrich Co. LLC. Another suitable Nylon 12 material may be PA 2200 which is available from Electro Optical Systems EOS GmbH. Other examples of suitable build materials may include, for example, powdered metal materials, powdered composited materials, powder ceramic materials, powdered glass materials, powdered resin material, powdered polymer materials, and the like, and combinations thereof. It should be understood, however, that the examples described herein are not limited to powder-based materials or to any of the materials listed above. In other examples the build material may be a paste, liquid, or a gel. According to one example a suitable build material may be a powdered semi-crystalline thermoplastic material. Some materials may have a low heat conductivity, resulting in increased risk of coalescence bleed. For example some nylons may have a heat conductivity of about 0.1 W/m K at room temperature and about 0.2 W/m K at its melting point.

The additive manufacturing system 200 may include a system controller 210. Any of the operations and methods disclosed herein may be implemented and controlled in the additive manufacturing system 200 and/or controller 210.

The controller 210 may include a processor 212 for executing instructions such as those described in the methods herein. The processor 212 may, for example, be a microprocessor, a microcontroller, a programmable gate array, an application specific integrated circuit (ASIC), a computer processor, or the like. The processor 212 may, for example, include multiple cores on a chip, multiple cores across multiple chips, multiple cores across multiple devices, or combinations thereof. In some examples, the processor 212 may include at least one integrated circuit (IC), other control logic, other electronic circuits, or combinations thereof.

The controller 210 may support direct user interaction. For example, the additive manufacturing system 200 may include user input devices 220 coupled to the processor 212, such as one or more of a keyboard, touchpad, buttons, keypad, dials, mouse, track-ball, card reader, or other input devices. Additionally, the additive manufacturing system 200 may include output devices 222 coupled to the processor 212, such as one or more of a liquid crystal display (LCD), printer, video monitor, touch screen display, a light-emitting diode (LED), or other output devices. The output devices 222 may be responsive to instructions to display textual information or graphical data.

The processor 212 may be in communication with a computer-readable storage medium 216 via a communication bus 214. The computer-readable storage medium 216 may include a single medium or multiple media. For example, the computer readable storage medium 216 may include one or both of a memory of the ASIC, and a separate memory in the controller 210. The computer readable storage medium 216 may be any electronic, magnetic, optical, or other physical storage device. For example, the computer-readable storage medium 216 may be, for example, random access memory (RAM), static memory, read only memory, an electrically erasable programmable read-only memory (EEPROM), a hard drive, an optical drive, a storage drive, a CD, a DVD, and the like. The computer-readable storage medium 216 may be non-transitory. The computer-readable storage medium 216 may store, encode, or carry computer executable instructions 218 that, when executed by the processor 212, may cause the processor 212 to perform any one or more of the methods or operations disclosed herein according to various examples.

The system 200 may include a coalescing agent distributor 202 to selectively deliver coalescing agent to successive layers of build material provided on a support member 204. According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. In one example such an ink may additionally comprise a UV light absorber. Examples of inks comprising visible light enhancers are dye based colored ink and pigment based colored ink, such as inks commercially known as CM993A and CE042A available from Hewlett-Packard Company.

In one example the support member 204 has dimensions in the range of from about 10 cm by 10 cm up to 100 cm by 100 cm. In other examples the support member 204 may have larger or smaller dimensions. The support member 204 may be a fixed part of the system 200, or may not be a fixed part of the system 200, instead being, for example, a part of a removable module.

The controller 210 controls the selective delivery of coalescing agent to a layer of provided build material in accordance with instructions comprising agent delivery control data 208.

The agent distributor 202 may be a printhead, such as thermal printhead or piezo inkjet printhead. The printhead may have arrays of nozzles. In one example, printheads such as those commonly used in commercially available inkjet printers may be used. In other examples, the agents may be delivered through spray nozzles rather than through printheads. Other delivery mechanisms may be used as well.

The agent distributor 202 may be used to selectively deliver, e.g. deposit, coalescing agent when in the form of a suitable fluid such as liquid. In some examples, the agent distributor 202 may be selected to deliver drops of agent at a resolution of between 300 to 1200 dots per inch (DPI), for example 600 DPI. In other examples the agent distributor 202 may be selected to be able to deliver drops of agent at a higher or lower resolution. In some examples, the agent distributor 202 may have an array of nozzles through which the agent distributor 202 is able to selectively eject drops of fluid. In some examples, each drop may be in the order of about 10 pico liters (pl) per drop, although in other examples the agent distributor 202 is able to deliver a higher or lower drop size. In some examples the agent distributor 202 is able to deliver variable size drops.

In some examples the coalescing agent may comprise a liquid carrier, such as water or any other suitable solvent or dispersant, to enable it to be delivered via a printhead.

In some examples the printheads may be drop-on-demand printhead. In other examples the printhead may be continuous drop printhead.

In some examples, the agent distributor 202 may be an integral part of the system 200. In some examples, the agent distributor 202 may be user replaceable, in which case they may be removably insertable into a suitable agent distributor receiver or interface module of the system 200.

In the example illustrated in FIG. 2a, the agent distributor 202 may have a length that enables it to span the whole width of the support member 204 in a so-called page-wide array configuration. In one example this may be achieved through a suitable arrangement of multiple printheads. In other examples a single printhead having an array of nozzles having a length to enable them to span the width of the support member 204 may be used. In other examples, the agent distributor 202 may have a shorter length that does not enable it to span the whole width of the support member 204.

The agent distributor 202 may be mounted on a moveable carriage to enable it to move bi-directionally across the length of the support 204 along the illustrated y-axis. This enables selective delivery of coalescing agent across the whole width and length of the support 204 in a single pass. In other examples the agent distributor 202 may be fixed, and the support member 204 may move relative to the agent distributor 202.

It should be noted that the term 'width' used herein is used to generally denote the shortest dimension in the plane parallel to the x and y axes illustrated in FIG. 2a, whilst the term 'length' used herein is used to generally denote the longest dimension in this plane. However, it will be understood that in other examples the term 'width' may be interchangeable with the term 'length'. For example, in other examples the agent distributor 202 may have a length that enables them to span the whole length of the support member 204 whilst the moveable carriage may move bi-directionally across the width of the support member 204.

In another example the agent distributor 202 does not have a length that enables it to span the whole width of the support member but are additionally movable bi-directionally across the width of the support member 204 in the illustrated x-axis. This configuration enables selective delivery of coalescing agent across the whole width and length of the support 204 using multiple passes. Other configurations, however, such as a page-wide array configuration, may enable three-dimensional objects to be created faster.

The coalescing agent distributor 202 may include a supply of coalescing agent or may be connectable to a separate supply of coalescing agent.

The system 200 further comprises a build material distributor 224 to provide, e.g. deliver and/or deposit, successive layers of build material on the support 204. Suitable build material distributors 224 may include, for example, a wiper blade and a roller. Build material may be supplied to the build material distributor 224 from a hopper or build material store. In the example shown the build material distributor 224 moves across the length (y-axis) of the support 204 to deposit a layer of build material. As previously described, a layer of build material will be deposited on the support 204, whereas subsequent layers of build material will be deposited on a previously deposited layer of build material. The build material distributor 224 may be a fixed part of the system 200, or may not be a fixed part of the system 200, instead being, for example, a part of a removable module.

In some examples, there may be additional coalescing agent distributors, such as the agent distributor 206. In some examples, the distributors of system 200 may be located on the same carriage, either adjacent to each other or separated by a short distance. In other examples, two or more carriages each may contain one or more distributors. For example, each distributor may be located in its own separate carriage. Any additional distributors may have similar features as those discussed earlier with reference to the coalescing agent distributor 202. However, in some examples, different agent distributors may deliver different coalescing agents, for example.

In the example shown the support 204 is moveable in the z-axis such that as new layers of build material are deposited a predetermined gap is maintained between the surface of the most recently deposited layer of build material and lower surface of the agent distributor 202. In other examples, however, the support 204 may not be movable in the z-axis and the agent distributor 202 may be movable in the z-axis.

The system 200 may additionally include an energy source 226 to apply energy to build material to cause the solidification of portions of the build material according to where coalescing agent has been delivered or has penetrated. In some examples, the energy source 226 is an infra-red (IR) radiation source, near infra-red radiation source, halogen radiation source, or a light emitting diode. In some examples, the energy source 226 may be a single energy source that is able to uniformly apply energy to build material deposited on the support 204. In some examples, the energy source 226 may comprise an array of energy sources.

In some examples, the energy source 226 is configured to apply energy in a substantially uniform manner to the whole surface of a layer of build material. In these examples the energy source 226 may be said to be an unfocused energy source. In these examples, a whole layer may have energy applied thereto simultaneously, which may help increase the speed at which a three-dimensional object may be generated.

In other examples, the energy source 226 is configured to apply energy in a substantially uniform manner to a portion of the whole surface of a layer of build material. For example, the energy source 226 may be configured to apply energy to a strip of the whole surface of a layer of build material. In these examples the energy source may be moved or scanned across the layer of build material such that a substantially equal amount of energy is ultimately applied across the whole surface of a layer of build material.

In some examples, the energy source 226 may be mounted on the moveable carriage.

In other examples, the energy source 226 may apply a variable amount of energy as it is moved across the layer of build material, for example in accordance with agent delivery control data 208. For example, the controller 210 may control the energy source only to apply energy to portions of build material on which coalescing agent has been applied.

In further examples, the energy source 226 may be a focused energy source, such as a laser beam. In this example the laser beam may be controlled to scan across the whole or a portion of a layer of build material. In these examples the laser beam may be controlled to scan across a layer of build material in accordance with agent delivery control data. For example, the laser beam may be controlled to apply energy to those portions of a layer of on which coalescing agent is delivered.

The combination of the energy supplied, the build material, and the coalescing agent may be selected such that, excluding the effects of any coalescence bleed: i) portions of the build material on which no coalescing agent have been delivered do not coalesce when energy is temporarily applied thereto; and ii) portions of the build material on which only coalescing agent has been delivered or has penetrated coalesce when energy is temporarily applied thereto do coalesce.

The system 200 may additionally include a heater 230 to emit heat to maintain build material deposited on the support 204 within a predetermined temperature range. The heater 230 may have any suitable configuration. One example is shown in FIG. 2b, which is a simplified isometric illustration of a heater 230 for an additive manufacturing system according to some examples. The heater 230 may have an array of heating elements 232, as shown. The heating units 232 may be each be any suitable heating unit, for example a heat lamp such as an infra-red lamp. The heating units 232 may have a suitable shapes or configurations such as rectangular as shown in FIG. 2b. In other examples they may be circular, rod shaped, or bulb shaped, for example. The configuration may be optimized to provide a homogeneous heat distribution toward the area spanned by the build material. Each heating unit 232, or groups of heating units 232, may have an adjustable current or voltage supply to variably control the local energy density applied to the build material surface.

Each of the heating units 232 may correspond to its own respective area of the build material, such that each heating unit 232 may emit heat substantially toward its own area rather than areas covered by other heating units 232. For example, each of the sixteen heating units 232 in FIG. 2b may heat one of sixteen different areas of the build material, where the sixteen areas collectively cover the entire area of the build material. However, in some examples, each heating unit 232 may also emit, to a lesser extent, some heat which influences an adjacent area.

The system 200 may additionally include a temperature sensor 228, for example a point contactless temperature sensor such as a one or more thermocouples or one or more thermopile, or such as a thermographic camera. The temperature sensor 228 may be to capture temperature values or an image representing a radiation distribution emitted by each point of the build material across the area spanned by the build material on the support member 204. The temperature sensor 228 may output the radiation distribution to the controller 210, which may determine a temperature distribution across the build material based on known relationships, such as a black body distribution, between temperature and radiation intensity for the material used as the build material. For example, the radiation frequencies of the radiation distribution may have their highest intensities at particular values in the infra-red (IR) range. This may be used to determine the temperature distribution comprising a plurality of temperatures across the build material.

The thermographic camera 228 may be oriented generally centrally and facing generally directly toward the build material, such that the optical axis of the camera targets the center line of the support member 204, to allow a generally symmetric capture of radiation from the build material. This may minimize perspective distortions of the build material surface, thus minimizing the need for corrections, and reducing errors in measured temperature values versus real temperature values. Additionally, the thermographic camera 228 may be able to (1) capture the image over a wide region covering an entire layer of build material, for example by using suitable magnification, (2) capture a series of images of the entire layer which are later averaged, or (3) capture a series of images each covering a portion of the layer that together cover the entire layer. In some examples, the thermographic camera 228 may be in a fixed location relative to the support member 204, but in other examples may be moveable if other components, when moving, disrupt the line of sight between the camera 228 and the support member 204.

Although FIG. 2a illustrates the temperature sensor 228 as a thermographic camera, in other examples the temperature sensor 228 may include an array of fixed-location pyrometers which each capture radiation from a single area, each area corresponding to the area generally heated by one of the heating units 232 of the heater 230. In other examples, the temperature sensor 228 may be a single pyrometer which may be operable to sweep or scan over the entire area of the build material.

Although in FIG. 2a the energy source 226, heater 230, and thermographic camera 228 are shown in particular locations above the support member 204, they may each be placed in any suitable location above or around the support member 214.

FIG. 3 is a flow diagram illustrating a method 300 of generating a three-dimensional object according to some examples. The method may be computer implemented. In some examples, the orderings shown may be varied, such that some steps may occur simultaneously, some steps may be added, and some steps may be omitted.

In describing FIG. 3, reference will be made to FIGS. 2a, 2b, 5a-d, and 6a-d. FIGS. 5a-d show a series of cross-sectional side views of layers of build material according to some examples. FIGS. 6a-d show a series of top views of the layers of build material of FIGS. 5a-d according to some examples. The method 300 may allow temperature regulation based on temperature feedback during processing of each layer, or every group of layers such as every second or third layer, for example.

Turning to block 302, the controller 210 may obtain agent delivery control data 208. The agent delivery control data 208 may define for each slice of the three-dimensional object to be generated the portions or the locations on the build material, if any, at which coalescing agent is to be delivered.

The agent delivery control data 208 may be derived, for example, by a suitable three-dimensional object processing system. In some examples the three-dimensional object processing system may be comprised within the additive manufacturing system 200. For example, the instructions 218 may additionally include instructions that, when executed by the processor 212, cause the processor 212 to operate as a three-dimensional object processing system as described herein. In other examples the three-dimensional object processing system may be external to the additive manufacturing system 200. For example, the three-dimensional object processing system may be a software application, or part of a software application, executable on a computing device separate from the system 200.

In some examples, the agent delivery control data 208 may be generated based on object design data representing a three-dimensional model of an object to be generated, and/or from object design data representing properties of the object. The model may define the solid portions of the object, and may be processed by the three-dimensional object processing system to generate slices of parallel planes of the model. Each slice may define a portion of a respective layer of build material that is to be solidified by the additive manufacturing system. The object property data may define properties of the object such as density, surface roughness, strength, and the like.

The object design data and object property data may be received, for example, from a user via an input device 220, as input from a user, from a software driver, from a software application such as a computer aided design (CAD) application, or may be obtained from a memory storing default or user-defined object design data and object property data.

In some examples the object processing system may obtain data relating to characteristics of the additive manufacturing system 200. Such characteristics may include, for example, build material layer thickness, properties of the coalescing agent, properties of the build material, and properties of the energy source 226, properties of the heater 230, and properties of the temperature sensor 228.

The agent delivery control data 208 may describe, for each layer of build material to be processed, locations or portions on the build material at which coalescing agent is to be delivered. In one example the locations or portions of the build material at which coalescing agent is to be delivered are defined by way of respective patterns.

At block 304, a layer 502c of build material may be provided, as shown in FIGS. 5a and 6a. For example, the controller 210 may control the build material distributor 224 to provide the layer 502c on previously completed layers 502a-b on the support member 204 by causing the build material distributor 224 to move along the y-axis as discussed earlier. The completed layers 502a-b may include a solidified portion 510. Although layers 502a-b are shown as completed in FIGS. 5a-d for illustrative purposes, it is understood that two iterations of the blocks 304 to 330 may initially be applied to generate the layers 502a-b.

In some examples, the thickness of each layer of build material provided may have a value selected from the range of between about 50 to about 300 microns, or about 90 to about 110 microns, or about 150 microns, although in other examples thinner or thicker layers of build material may be provided. The thickness may be controlled by the controller 210, for example based on the agent delivery control data 208.

At block 306, a temperature distribution of the build material may be determined. For example, the temperature sensor 228 may obtain temperature feedback, for example by capturing an image representing a radiation distribution of the build material. As discussed earlier, in other examples, a series of images may be taken to generate a composite or averaged image representing the radiation distribution. The radiation distribution may be used by the controller 210 or by a processor in the sensor 228 to determine a temperature distribution of the build material based on known relationships, such as a black body distribution, between temperature and radiation intensity for the material used as the build material. The known relationship may, for example, assume a fixed conversion from radiant intensity to temperature, and may assume, for example, 100% emissivity of the build material. This emissivity assumption may be corrected at block 314, as will be discussed.

At block 308, a coordinate transformation algorithm may be used to map the coordinates of the measured temperature distribution to the spatial coordinates of the layer 502c of the material. The known relationship between these coordinates may be stored in a memory of the controller 210. If the sensor 228 and support member 204 are movable relative to each other, then a plurality of relationships may be stored for each possible relative spatial configuration of the sensor 228 and the support member 204. The coordinate transformation algorithm may correct for any perspective errors and may include a scale factor conversion between pixel distances of the measured distribution and real world lengths along the build material. In some examples, additional fine adjustment of the mapping may be made based on patterns provided in the build material which are detectable by the sensor 228. For example, the build area may be provided in locations, for example the corners of the build area, with patterns such as dot grids or interference patterns, and/or with delivery of a different-colored build materials, to allow for detection by the sensor 228 to allow subsequent mapping between the measured temperature distribution and the layer 502c.

At block 310, the data pixels of the temperature distribution data may be interpolated to increase the number of data points in the temperature distribution data such that it has more data pixels. Interpolation is a method of determining new data points between a set of known data points. For example, an interpolation algorithm may be applied by the controller 210 to triangulate the planar set of data pixels having X and Y coordinates to determine a regular grid of interpolated data pixels representing interpolated temperature values in the temperature distribution. The interpolation algorithm may use linear or smooth polynomial interpolation, for example. In some examples, such as if the temperature sensor 228 did not sufficiently capture an image of the outer areas of build material, then grid points outside of the triangulation area may be extrapolated.

At block 312, for each region of the current layer 502c, each previously completed layer may be associated with a weighting factor according to the respective previous layer's expected influence on a property of the current layer 502c, for example (1) actual surface temperature of the respective region of current layer 502c, and/or (2) properties that affect surface temperature measurements of the respective region of the current layer 502c, such as the emissivity of the surface of the current layer 502c.

The actual surface temperature of a region of the current layer 502c may differ, e.g. be increased, depending on if coalesced and solidified regions are in nearby locations in the previous layers. This may occur because heat produced during coalescence of portions of previous layers may propagate from the coalesced regions into the region of the current layer 502c.

The surface temperature measurements of a region of the current layer 502c, e.g. emissivity of the region's surface, may differ depending on whether there are coalesced and solidified regions in nearby locations in the previous layers. As discussed earlier, build material that has coalesced may exhibit different emissivity than build material that has not coalesced. The current layer 502c may be transparent to radiation, such as IR radiation, that is used in measuring temperature. Thus, the emissivity exhibited by a region of the surface of layer 502c may be affected by whether regions immediately below in previous layers have coalesced and solidified.

As discussed earlier, the object design data may represent a three-dimensional model defining solid portions of each layer of the object being generated and/or properties of the object. The object design data may be used to generate the agent delivery control data 208, which may define locations of the build material in which agents are to be delivered and/or solidification is desired. Thus, the object design data and/or agent delivery control data 208 may be used by the controller 210 to determine previous layer data representing the weighting factors assigned to each of the previous layers for each region of the current layer 402c.

In some examples, the contribution of each of the previous layers may, for example, be determined using a thermal process model, which mathematically models heat diffusion based on the object design data and/or agent delivery control data 208. In some examples, the contribution of each of the previous layers may also, for example, be determined using a model describing effects of each of the previous layers on emissivity of the surface of the current layer 502c.

In various examples, one, two, three, or more previous layers may be incorporated into the determination of the previous layer data. Although for illustrative purposes, FIGS. 5a-5d show two previously completed layers 502a-b, there may be multiple additional completed layers stacked beneath the current layer 502c.

In some examples, on average, the closer in distance the previous layer is to the current layer, the greater contribution it may have to the previous layer data. However, there may be exceptions. For example, a layer immediately beneath the current layer may (1) have smaller regions of coalescence than the layer beneath the layer that is beneath the current layer, and therefore may (2) be colder, (3) less significantly affect emissivity of the current layer, (4) despite its closer proximity to the current layer, contribute relatively less to the previous layer data.

At block 314, based on the previous layer data and based on properties of the current layer, e.g. as defined in the agent design data or agent delivery control data 208, the controller 210 may determine a property that affects surface temperature measurements of the layer 502c, such as emissivities of regions of the surface of current layer 502c. These emissivities may be determined based on known properties of the materials used, and properties of such solidified, non-solidified, heated, melted, and non-melted regions of these materials, and resultant surface characteristics of these materials, geometries of the delivered layers, and the like. All of the above data may be considered emissivity data.

Thus, for example, in FIGS. 5a and 6a, the central solidified region 510 of layers 502a-b may be expected to cause the center region 508 of the surface of layer 502c to have a different emissivity than the outer surface region 508 of layer 502c, for example (1) due to heat conduction from the solidified region 510 below, and (2) due to the optical depth of the build material being greater than the thickness of each layer of build material, meaning that the solidified region 510 of layers 502a-b may be visible to the temperature sensor 228 thereby affecting emissivity.

The current layer 502c may have an effect on the emissivity of the current layer 502c, therefore the weighting factor representing the influence of the current layer 502c on the emissivity may also have been determined. However, as shown in FIGS. 5a and 6a, variations in emissivity across regions of the surface of the layer 502c may not result from properties of the current layer 502c, because, for example, all of the build material of the current layer 502c may not be coalesced or solidified. Thus, the current layer 502c may contribute uniformly to its own emissivity across its regions. However, in other examples, delivery of the coalescing agent 504 may be performed between blocks 304 and 306 instead of at block 328, as shown in FIG. 3. In such case, the agent 504 in the layer 502c itself may be expected to additionally effect emissivity in the central region of the layer 502c, such that the current layer 502c may contribute to non-uniformities in emissivity in the current layer 502c.

At block 316, based on the determined properties that effect surface temperature measurements, e.g. emissivities, from block 314, the controller 210 may determine groupings, e.g. divisions, of the surface of the current layer 502c into one or more regions, such that each region is expected to exhibit a substantially constant or substantially constant determined property, e.g. emissivity. The determined property is a property that affects surface temperature measurements of the respective region of the current layer 502c.

For example, in FIGS. 5a and 6a, region 506 of the surface of layer 502c may have constant or substantially constant emissivity, for example because there are no solidified regions in regions of layers 502a-b underneath the region 506. Additionally, region 508 of the surface of layer 502c may have constant or substantially constant emissivity, for example because the regions of layers 502a-b underneath the region 506 are fully solidified. Although FIGS. 5a and 6a show two regions each having different emissivities, in other examples the entire surface of the current layer may have constant or substantially constant emissivity, or there may be three or more regions with different emissivities.

At block 318, temperature distribution data in a selected region of the surface of the layer 502c may be averaged at points throughout the selected region to determine an average temperature.

In some examples, the selected region may comprise regions of layer 502c having different emissivities, for example including both of the regions 506 and 508. Thus, the selected region may comprise the entire measured area of the surface of the layer 502c. In this case, based on the determined regions 506 and 508, the temperature distribution data, which may initially at block 306 have been generated based on an assumption of a fixed conversion from radiant intensity to temperature and assuming an emissivity such as 100%, may be corrected based on the groupings and emissivity data. For example, in FIGS. 5a and 6a, if any of the regions 506 and 508 were determined at block 314 to have less than 100% emissivity, the temperature distribution data for those regions may be corrected. Then, the corrected temperature distribution data may be averaged at points throughout the regions 506 and 508 to determine an average temperature.

In other examples, the selected region may comprise one region of constant or substantially constant emissivity regions, such as region 506 or 508. Then, the corrected temperature distribution data may be averaged at points throughout the region 506 or 508 to determine an average temperature. In some examples, the sensor 228 may be programmed to deliver images only in predetermined regions expected or desired to have constant emissivity.

At block 320, the determined average temperature may be compared with a predetermined target temperature stored in a memory of the controller 210. The target temperature may be set below a temperature at which the build material would experience coalescence in the presence of coalescing agent 504. For example, if the build material is Nylon 12, the target temperatures may range between about 155 and about 160 degrees Celsius, or be centered at about 160 degrees Celsius. In another example, if the build material is a thermoplastic polyurethane, the target temperature may be about 90 degrees. However, other temperatures may be suitable depending on the properties of the build material used.

At decision block 322, if the comparison at block 320 shows that the average temperature has not reached or has not substantially reached the target temperature distribution, then the method 300 may proceed to block 324 to perform calibration. If the average temperature has reached or has substantially reached the target temperature distribution, then the method 300 may proceed to block 328 to perform one or more process events.

At block 324, the system 200 may attempt to achieve the predetermined target temperature by cooling or heating the layer 502c. This may be done passively or actively. In some examples, the controller 210 may generate compensation signals to send to devices in the system 200 that implement cooling or heating.

In some examples, such as if the average temperature is greater than the target temperature, the build material may be cooled. The average temperature may be greater than the target temperature if, for example, over-heating had occurred in parts of the previous layer 502b when applying energy to solidify the build material, and such heat later propagated to layer 502c after layer 502c was applied.

In some examples, passive cooling may be implemented, for example the controller 210 may wait a period of time which the controller 210 may determine as needed for the layer 502c to dissipate heat and therefore cool to the predetermined target temperature. The determination may be made based on a thermal process model which mathematically models heat diffusion based on the object design data and/or agent delivery control data 208. The model may involve solving the heat equation using finite element analysis, or may involve any other suitable method.

In other examples, active cooling may be implemented, for example the controller 210 may cause a cooling mechanism in the system 200 to cool the layer 502c. Any suitable cooling mechanism may be used, such as a cooling agent that is deliverable from an agent distributor to the layer 502c, or a fan, for example.

In other examples, heating may be implemented, such as if the average temperature is lesser than the target temperature. The heating may be active. Based on the differences between the average temperature and the target temperature, a temperature compensation signal may be generated for each of the heating units 232. Each compensation signal may represent, for example, a voltage or current to be supplied to a respective heating unit 232. Each heating unit 232 may correspond to a region of pixels comprising a grid of pixels in the temperature distribution that likewise corresponds to a spatial region on the surface of the build material.

In some examples, generating the compensation signal may be performed based on a thermal process model which mathematically models heat diffusion based on the object design data and/or agent delivery control data 208. The model may involve solving the heat equation using finite element analysis, or may involve any other suitable method.

In some examples, generating the compensation signal may involve the following process. A physical model for radiation delivery from the heater 230 to the build material may be defined. The physical model may be represented mathematically as an objective function. The physical model may, for example, be a ray tracing model, which may, for example, incorporate known input parameters including physical factors such as the geometry of the heater 230 and the support member 204 and build material, and any other physical factors affecting radiation trajectory. The ray tracing model may also incorporate unknown input parameters including compensation signals, which e.g. defining voltage or current to be supplied to each of the heating units 232. Based on the known and unknown input parameters, the ray tracing model may output a model temperature distribution over the build material.

The unknown input parameters, e.g. the compensation signals such as voltages or currents, may be determined by applying a minimization algorithm to the objective function to minimize the difference between the model temperature distribution and the known target temperature. Any suitable minimization algorithm may be used, for example least square fitting such as by using a Levenberg Marquardt algorithm. Thus, the determined compensation signals may be used to heat the build material to the target temperature.

In some examples, a neural network model may instead be used to determine the unknown input parameters, e.g. the compensation signals such as voltages or currents, based on the known parameters. The neural network model may, in some examples, be self-adapting to the specific features of the system 200 including the heater 230 and the support member 204.

In some examples, generating the compensation signal may be performed based on stored look-up tables defining heat diffusion characteristics of various three-dimensional objects. Thus, the controller 210 may match the agent delivery control data 208 with a suitable look-up table to adjust the compensation signal. The look up tables may have been pre-calculated using any of the models above, such as the physical model, the neural network model, or thermal process model, for example.

In some examples, any combination of the above methods in determining the compensation signals may be used.

Based on the compensation signals, the layer 702c of build material may then be heated by the heater 230 to heat the build material to the predetermined target temperature. Each of the heating units 232 may heat, based on their respective compensation signals, their respective spatial regions of the build material to achieve the target temperature. Thus, the entire layer 702c may be heated.

In some examples, use of the heater 230 may help reduce the amount of energy that has to be applied by the energy source 226 at block 326 to cause coalescence and subsequent solidification of build material on which coalescing agent has been delivered or has penetrated. As mentioned earlier, the target temperature may be set below a temperature at which the build material would experience coalescence in the presence of coalescing agent 504. Pre-heating may help reduce the amount of energy that has to be applied by the energy source 226 to cause coalescence and subsequent solidification of build material on which coalescing agent has been delivered or has penetrated.

However, in other examples, pre-heating may not be desired. However, in this example, the target temperature may likewise be lower than a temperature at which the build material would experience bonding in the presence of coalescing agent 404.

At decision block 326, it may be determined whether an additional iteration of blocks 306 to 324 may be performed to bring the average temperature closer to the predetermined target temperature. This determination may be based on the difference between the average temperature and the predetermined target temperature determined in the latest iteration at block 320. If the difference was below a threshold, then it may be presumed that the predetermined target temperature is, after block 324, achieved to a sufficient degree. Thus, the method 300 may proceed to block 328. Otherwise, the method 300 may iterate by returning to block 306.

At blocks 328 and 330, one or more process events may be implemented. The process events may complete the current layer 502c. Examples of process events are shown below, but other additional or alternative process events may be implemented.

At block 328, a coalescing agent 504 may be selectively delivered to one or more portions of the surface of the layer 502c of build material, as shown in FIGS. 5b and 6b. As discussed earlier, the agent 504 may be delivered by agent distributor 202, for example in the form of fluids such as liquid droplets.

The selective delivery of the agent 504 may be performed in patterns on portions of the layer 502c that the agent delivery control data 208 may define to become solid to form part of the three-dimensional object being generated. "Selective delivery" means that coalescing agent may be delivered to selected portions of the surface layer of the build material in various patterns. The patterns may be defined by the agent delivery control data 208.

FIGS. 5c and 6c shows coalescing agent 504 having penetrated substantially completely into the layer 502c of build material, but in other examples, the degree of penetration may be less than 100%. The degree of penetration may depend, for example, on the quantity of agent delivered, on the nature of the build material, on the nature of the agent, etc.

At block 330, a predetermined level of energy may be temporarily applied to the layer 502c of build material. In various examples, the energy applied may be infra-red or near infra-red energy, microwave energy, ultra-violet (UV) light, halogen light, ultra-sonic energy, or the like. The length of time the energy is applied for, or energy exposure time, may be dependent, for example, on one or more of: characteristics of the energy source; characteristics of the build material; and characteristics of the coalescing agent. The type of energy source used may depend on one or more of: characteristics of the build material; and characteristics of the coalescing agent. In one example, the energy may be applied for a predetermined length of time.

The temporary application of energy may cause portions of the build material on which coalescing agent 504 has been delivered or has penetrated to heat up above the melting point of the build material and to coalesce. For example, the temperature of the layer 502c may achieve about 220 degrees Celsius. Upon cooling, the portions which have coalesced become solid and form part of the three-dimensional object being generated. As discussed earlier, one such portion 510 spanning layers 502a-b may have been generated in previous iterations. The heat absorbed during the application of energy may propagate to the previously solidified portion 510 to cause part of portion 510 to heat up above its melting point. This effect helps creates a portion 512 that has strong interlayer bonding between adjacent layers of solidified build material, as shown in FIGS. 5d and 6d.

After a layer of build material has been processed as described above, new layers of build material may be provided on top of the previously processed layer of build material. In this way, the previously processed layer of build material acts as a support for a subsequent layer of build material. The process of blocks 304 to 330 may then be repeated to generate a three-dimensional object layer by layer.

As mentioned earlier, the method 300 may allow temperature regulation based on temperature feedback for each layer, or for every group of layers such as every second or third layer. For example, the method 300 as described in detail above describes temperature regulation based on temperature feedback during block 306 to 326 after delivering build material at block 304. In other examples, block 328, which involves delivering agents, may be performed between blocks 304 and 306, such that block 322 proceeds to block 330 if calibration is not to be done. In such examples, both delivery of build material and agents is performed prior to the temperature regulation based on temperature feedback of blocks 306 to 326. However, this example still allows for temperature regulation based on feedback for each layer or group of layers.

However, in other examples, block 304 may occur after block 326, such that block 322 proceeds to block 304 if calibration is not to be done. In yet other examples, the temperature regulation based on feedback of blocks 306 to 326 may be performed when quality metrics such as measured deformations exceed a threshold, or if a user activates the feedback system.

FIG. 4 is a flow diagram illustrating a method 400 of generating a three-dimensional object according to some examples. The method may be computer implemented. In some examples, the orderings shown may be varied, such that some steps may occur simultaneously, some steps may be added, and some steps may be omitted. In describing FIG. 4, reference will be made to FIGS. 2a, 2b, 5a-d, and 6a-d, each of which may also be applicable to FIG. 4 in addition to FIG. 3. The method 300 may allow temperature regulation based on temperature feedback during processing of each layer, or every group of layers such as every second or third layer, for example.

Turning to block 402, the controller 210 may obtain agent delivery control data 208, in a similar manner as that described relative to block 302 of FIG. 3.

At block 404, a layer 502c of build material may be provided, as shown in FIGS. 5a and 6a, similar to as described relative to block 304 in FIG. 3. Although layers 502a-b are shown as completed in FIGS. 5a-d for illustrative purposes, it is understood that two iterations of the blocks 404 to 428 may initially be applied to generate the layers 502a-b.

At block 406, for each region of the current layer 502c, each previously completed layer may be associated with a weighting factor according to the respective previous layer's expected influence on (1) actual surface temperature of the respective region of current layer 502c, and (2) properties that affect surface temperature measurements of the respective region of the current layer 502c, such as the emissivity of the surface of the current layer 502c. This may be done in a similar manner as that described relative to block 312 of FIG. 3.

At block 408, based on the previous layer data and based on properties of the current layer, e.g. as defined in the agent design data or agent delivery control data 208, the controller 210 may determine a property that affects surface temperature measurements of the layer 502c, such as emissivities of regions of the surface of current layer 502c. This may be done in a similar manner as that described relative to block 314 of FIG. 3.

In some examples, the current layer 502c may contribute uniformly to its own emissivity across its regions because coalescing agent 504 may have yet to be delivered thereon. However, in other examples, delivery of the coalescing agent 504 may be performed between blocks 404 and 406 instead of at block 426, as shown in FIG. 4. In such case, the agent 504 in the layer 502c itself may be expected to additionally affect emissivity in the central region of the layer 502c.

At block 410, based on the determined properties that effect surface temperature measurements, e.g. emissivities, from block 412, the controller 210 may determine groupings, e.g. divisions, of the surface of the current layer 502c into one or more regions, such that each region is expected to exhibit a substantially constant or substantially constant determined property, e.g. emissivity. This may be done in a similar manner as that described relative to block 316 of FIG. 3.

At block 412, a coordinate transformation algorithm may be used to map the coordinates of the constant-emissivity regions, such as regions 506 and 508, to the coordinates of the area of the layer 502c to be measured by the temperature sensor 228. The known relationship between these coordinates may be stored in a memory of the controller 210. If the sensor 228 and support member 204 are movable relative to each other, then a plurality of relationships may be stored for each possible relative spatial configuration of the sensor 228 and the support member 204. The coordinate transformation algorithm may correct for perspective error and may include a scale factor conversion between pixel distances of the measured distribution and real world lengths along the build material. In some examples, additional fine adjustment of the mapping may involve calibrating based on patterns provided in the build material which are detectable by the sensor 228. For example, the build area may be provided in locations, for example the corners of the build area, with patterns such as dot grids or interference patterns, and/or with delivery of a different-colored build materials, to allow for detection by the sensor 228 to allow subsequent mapping between the constant-emissivity regions and the area to be measured by the sensor 228.

At block 414, a temperature distribution of the build material may be determined. For example, the temperature sensor 228 may obtain temperature feedback, for example by capturing an image representing a radiation distribution of the build material. As discussed earlier, in other examples, a series of images may be taken to generate a composite or averaged image representing the radiation distribution. The radiation distribution may be used by the controller 210 or by a processor in the sensor 228 to determine a temperature distribution of the build material based on known relationships, such as a black body distribution, between temperature and radiation intensity for the material used as the build material. The known relationship may, for example, assume a fixed conversion from radiant intensity to temperature, and may assume, for example, 100% emissivity of the build material.

At block 416, temperature distribution data in a selected region of the surface of the layer 502c may be averaged at points throughout the selected region to determine an average temperature.

In some examples, the selected region may comprise regions of layer 502c having different emissivities, for example including both of the regions 506 and 508. Thus, the selected region may comprise the entire measured area of the surface of the layer 502c. In this case, based on the determined regions 506 and 508, the temperature distribution data, which may at block 414 have been generated based on an assumption of a fixed conversion from radiant intensity to temperature and assuming an emissivity such as 100%, may be corrected based on the groupings and emissivity data. For example, in FIGS. 5a and 6a, if any of the regions 506 and 508 were determined at block 314 to have less than 100% emissivity, the temperature distribution data for those regions may be corrected. Then, the corrected temperature distribution data may be averaged at points throughout the regions 506 and 508 to determine an average temperature.

In other examples, the selected region may comprise one region of constant or substantially constant emissivity regions, such as region 506 or 508. Then, the corrected temperature distribution data may be averaged at points throughout the region 506 or 508 to determine an average temperature. In some examples, the sensor 228 may be programmed to deliver images only in predetermined regions expected or desired to have constant emissivity.

At block 418, the determined average temperature may be compared with a predetermined target temperature stored in a memory of the controller 210. The target temperature may be set below a temperature at which the build material would experience bonding in the presence of coalescing agent 504. For example, if the build material is Nylon 12, the target temperatures may range between about 155 and about 160 degrees Celsius, or be centered at about 160 degrees Celsius. In another example, if the build material is a thermoplastic material, the target temperature may be about 90 degrees. However, other temperatures may be suitable depending on the properties of the build material used.

At decision block 420, if the comparison at block 418 shows that the average temperature has not reached or has not substantially reached the target temperature distribution, then the method 400 may proceed to block 422 to perform calibration. If the average temperature has reached or has substantially reached the target temperature distribution, then the method 300 may proceed to block 426 to perform one or more process events.

At block 422, the system 200 may attempt to achieve the predetermined target temperature by cooling or heating the layer 502c. This may be done in a similar manner as that described relative to block 324 of FIG. 3.

At decision block 424, it may be determined whether an additional iteration of blocks 414 to 422 may be performed to bring the average temperature closer to the predetermined target temperature. This determination may be based on the difference between the average temperature and the predetermined target temperature determined in the latest iteration at block 418. If the difference was below a threshold, then it may be presumed that the predetermined target temperature is, after block 422, achieved to a sufficient degree. Thus, the method 400 may proceed to block 426. Otherwise, the method 400 may iterate by returning to block 414.

At blocks 426 and 428, one or more process events may be implemented.

The process events may complete the current layer 502c. This may be done in a similar manner as that described relative to blocks 328 and 330 of FIG. 3.

After a layer of build material has been processed as described above, new layers of build material may be provided on top of the previously processed layer of build material. In this way, the previously processed layer of build material acts as a support for a subsequent layer of build material. The process of blocks 404 to 428 may then be repeated to generate a three-dimensional object layer by layer.

As mentioned earlier, the method 400 may allow temperature regulation based on temperature feedback for each layer, or for every group of layers such as every second or third layer. For example, the method 400 as described in detail above describes temperature regulation based on temperature feedback during block 406 to 424 after delivering build material at block 404. In other examples, block 426, which involves delivering agents, may be performed at any point between blocks 404 and 414, for example between blocks 404 and 406, such that block 420 proceeds to block 428 if calibration is not to be done. In such examples, both delivery of build material and agents is performed prior to the temperature regulation based on temperature feedback of blocks 406 to 424. However, this example still allows for temperature regulation based on feedback for each layer or group of layers.

However, in other examples, block 404 may occur after block 424, such that block 420 proceeds to block 404 if calibration is not to be done. In yet other examples, the temperature regulation based on feedback of blocks 406 to 424 may be performed when quality metrics such as measured deformations exceed a threshold, or if a user activates the feedback system.

All of the features disclosed in this specification (including any accompanying claims, abstract and drawings), and/or all of the steps of any method or process so disclosed, may be combined in any combination, except combinations where at least some of such features and/or steps are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. A system comprising:
   a controller to:
      receive temperature data representing a temperature distribution of at least part of a current layer of build material that is measured by a temperature sensor comprising a thermographic camera, the temperature distribution determined based on emissivity of the current layer of build material as detected by the thermographic camera;
      determine one or more weighting factors representing a degree of influence of each of one or more previous layers of the build material beneath the current layer on the emissivity of the current layer;
      identify one or more regions in the current layer based on the weighting factors and received temperature data for the identified regions;
      cause the current layer to achieve a target temperature when the temperature data of the identified one or more regions does not match the target temperature; and
      after causing the current layer to achieve the target temperature, form a layer of a three-dimensional object using the current layer of build material.

2. The system of claim 1 further comprising:
   an agent distributor to selectively delivering coalescing agent to a portion of the current layer to cause the portion to coalesce when energy is applied; and
   an energy source to apply energy to the current layer to cause the portion to coalesce and subsequently solidify, the controller to:
      after causing the current layer to achieve the target temperature, control the agent distributor to selectively deliver the coalescing agent to the portion of the current layer; and
      control the energy source to apply energy to the current layer to cause the portion to coalesce and subsequently solidify.

3. The system of claim 1 wherein the one or more previous layers comprise at least two previous layers.

4. The system of claim 1 wherein the controller is to cool the current layer to achieve the target temperature.

5. The system of claim 4 further comprising a cooling system to apply a cooling agent to cool the current layer to achieve the target temperature in the selected region.

6. The system of claim 1 wherein the one or more regions comprise at least two regions having different emissivities from each other.

7. The system of claim 6 wherein each of the identified two regions has a substantially constant emissivity.

8. The system of claim 6 wherein the controller is to cause the current layer to achieve the target temperature if the temperature data in the selected region of the identified two regions does not match the target temperature.

9. The system of claim 1 wherein the controller is to correct the temperature data based on the influence of the one or more previous layers on emissivities in the current layer prior to causing the current layer to achieve the target temperature.

10. The system of claim 1 wherein the temperature data comprises an average temperature of a plurality of temperature values of respective areas in the one or more regions.

11. The system of claim 1 wherein the selected region is above an un-solidified region of build material in one of the previous layers.

12. The system of claim 1 wherein the selected region is above a coalescing, solidifying, or solidified region of build material in one of the previous layers.

13. The system of claim 1 wherein the target temperature is achieved by heating the current layer to the target temperature.

14. The system of claim 1, further comprising a non-transitory computer readable storage medium including executable instructions that, when executed by controller, cause the controller to:
   receive, from the temperature sensor, temperature data representing the measured temperature distribution across the current layer of build material;
   determine an effect of the current layer or a previous layer of the build material beneath the current layer on emissivities across the current layer;

based on the determined effect, determine a plurality of regions in the current layer each having different emissivities from each other;

cause the current layer to reach a target temperature if the temperature data in a selected region of the determined regions is different from the target temperature.

15. A method of operating the system of claim 1, the method comprising, with the controller:

receiving, from the temperature sensor, the temperature data comprising a plurality of temperatures of the current layer of build material;

determining a weighting factor representing an effect of a previous layer of the build material underneath the current layer on a property of the current layer, the property affecting measurement of the plurality of temperatures;

identifying regions in the current layer based on the determined weighting factor and based on how the property is exhibited by each of the one or more regions; and achieving a target temperature in the current layer in response to a temperature of a selected region of the identified regions not matching the target temperature.

16. A system comprising:

a controller to:

receive temperature data representing a temperature distribution of at least part of a current layer of build material that is measured by a temperature sensor;

determine one or more weighting factors representing a degree of influence of each of one or more previous layers of the build material beneath the current layer on a property of the current layer;

identify one or more regions in the current layer based on the determined one or more weighting factors and received temperature data for the identified regions and based on how the property is exhibited by each of the one or more regions; and cool the current layer to achieve a target temperature when the temperature data in a selected region of the identified one or more regions exceeds the target temperature, prior to forming a layer of a three-dimensional object using the current layer of the build material.

17. The system of claim 16 further comprising a cooling system controlled by the controller to apply a cooling agent selectively to cool the current layer to achieve a target temperature when the temperature data in a selected region of the identified one or more regions exceeds the target temperature.

18. A system comprising:

a controller to:

receive temperature data representing a temperature distribution of at least part of a current layer of build material that is measured by a temperature sensor;

determine one or more weighting factors representing a degree of influence of each of multiple previous layers of the build material beneath the current layer on a property of the current layer;

identify one or more regions in the current layer based on received temperature data for the identified regions, the determined weighting factors of the degree of influence of each of multiple previous layers of the build material beneath the current layer on a property of the current layer and based on how the property is exhibited by each of the one or more regions in the current layer;

cause the current layer to achieve a target temperature when the temperature data in a selected region of the identified one or more regions does not match the target temperature; and after causing the current layer to achieve the target temperature, form a layer of a three-dimensional object using the current layer of build material.

19. The system of claim 18, further comprising a cooling system, under control of the controller, to cool the current layer to achieve a target temperature when the temperature data in a selected region of the identified one or more regions exceeds the target temperature.

20. The system of claim 18, the controller comprising a neural network model to identify one or more regions in the current layer based on the determined weighting factors.

* * * * *